March 24, 1959   M. KRAMCSAK, JR   2,878,899
BRAKE-EQUIPPED CASTER

Filed April 14, 1954

INVENTOR
M. Kramcsak, Jr.
BY Rockwell & Bartholow
ATTORNEYS

March 24, 1959  M. KRAMCSAK, JR  2,878,899
BRAKE-EQUIPPED CASTER

Filed April 14, 1954  3 Sheets-Sheet 2

INVENTOR
M. Kramcsak, Jr.
BY Rockwell & Bartholow
ATTORNEYS

March 24, 1959  M. KRAMCSAK, JR  2,878,899
BRAKE-EQUIPPED CASTER
Filed April 14, 1954  3 Sheets-Sheet 3
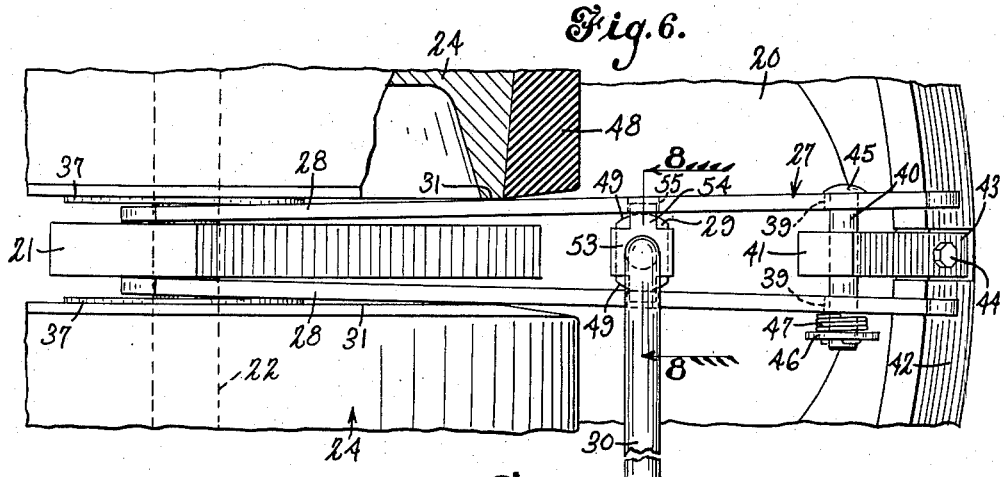
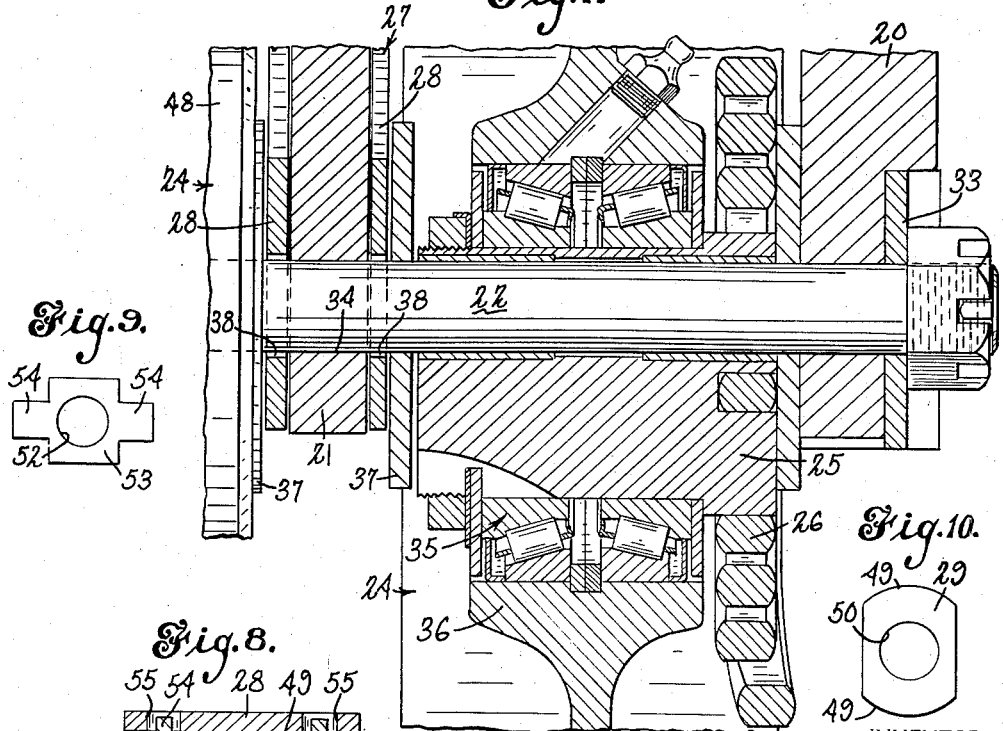
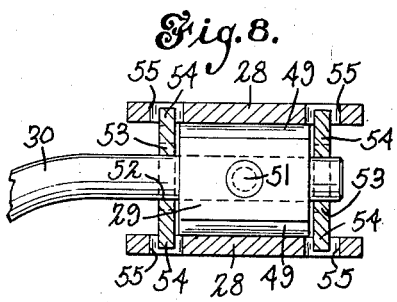
INVENTOR
M. Kramcsak, Jr.
BY Rockwell & Bartholow
ATTORNEYS

United States Patent Office 2,878,899
Patented Mar. 24, 1959

2,878,899

BRAKE-EQUIPPED CASTER

Michael Kramcsak, Jr., Bridgeport, Conn., assignor to The Bassick Company, Bridgeport, Conn., a corporation of Connecticut Application April 14, 1954, Serial No. 423,011

9 Claims. (Cl. 188—2)

This invention relates to brake-equipped casters, and more especially to brake-equipped casters of the duplex type where two wheels are mounted in laterally spaced relationship in a common forked support or horn.

The invention deals particularly with a caster of the above-mentioned type provided with a wheel-braking device that serves for the braking of both wheels, but in some aspects the invention is applicable to the braking of a single wheel.

An object of the invention is to provide a duplex caster with an effective braking device which acts at the same time upon both of the caster wheels.

Another object is to furnish an improved braking arrangement embodying a laterally moving brake shoe serving to brake the wheel by impingement with a braking surface at the peripheral part of the wheel face.

A further object is to provide a conveniently operable mechanism that is manually operable and includes swingably mounted brake shoes located between and acting upon wheels that have a laterally spaced arrangement on a common axle.

In the accompanying drawings:

Fig. 6 is a view similar to Fig. 5 showing the brake shoes applied to the wheels;

Fig. 7 is an enlarged section on line 7—7 of Fig. 1;

Fig. 8 is an enlarged section on line 8—8 of Fig. 6;

Fig. 9 is a detail of one of the plates shown in Fig. 8;

Fig. 10 is a face view of the cam shown in Fig. 8; and

Figure 1:
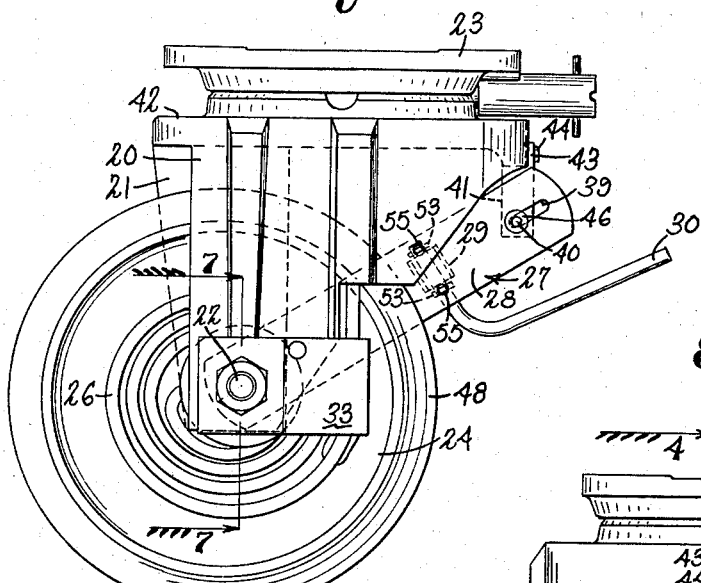
Fig. 1 is a side elevation of a caster embodying the invention.
Figure 2:
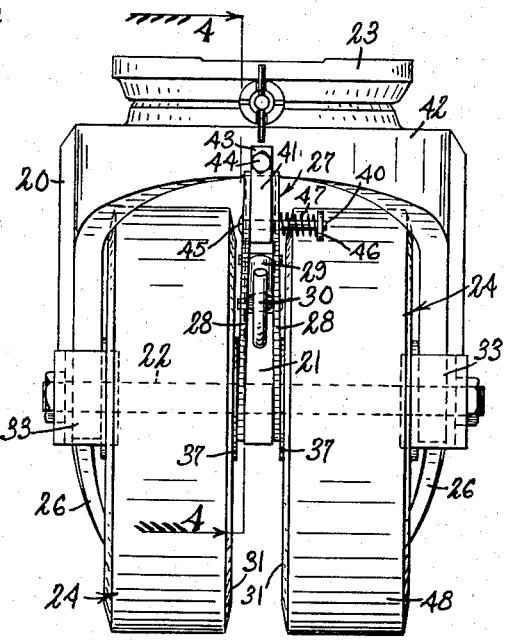
Fig. 2 is a rear elevation of the caster.
Figure 3:
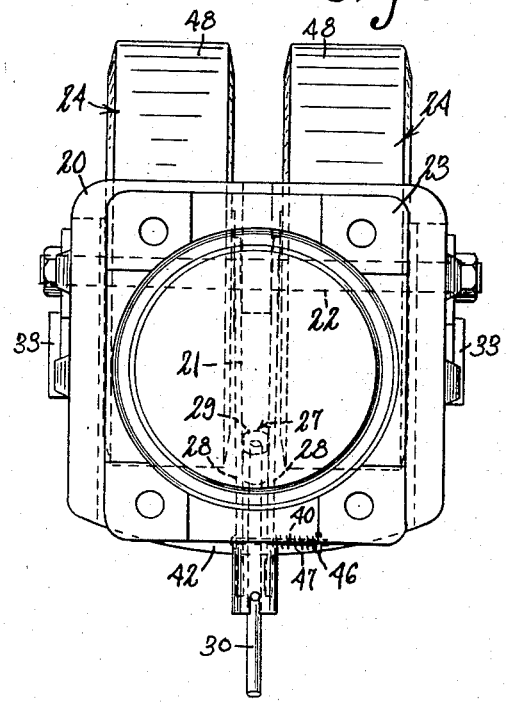
Fig. 3 is a top plan view.

The caster shown in the drawings by way of example is a duplex caster in which two wheels have laterally spaced arrangement in a common forked support or horn, the horn being provided with an intermediate depending partition or plate that serves as an intermediate support for the axle which is mounted in the lower ends of the horn legs. In this particular case the caster is a swivel caster in which the horn is swiveled to a fixed top plate that is applied to the under surface of a truck body or like object. In its general character the caster is similar to one shown in the W. F. Herold Patent No. 2,377,232, dated May 29, 1945, which is a duplex caster in which the wheels have a cushioned up-and-down movement relative to the axle, each wheel having a supporting axle portion, a skein mounted to turn thereon about an axis eccentric to the skein and supporting the corresponding wheel for rotation, and a spring of spiral form adjacent one end of the skein and connected at its inner end to the skein and at its outer end to the forked support. However, in the present case the spiral springs are shown as located at the remote sides of the wheels, being closely adjacent the inner faces of the horn legs. The braking device serving to brake the wheels includes laterally swingable brake shoes in the form of elongated plates, said plates being inclined upwardly and rearwardly with respect to the caster structure and having lower forward ends disposed about the axle at opposite sides of the partition between the wheels. These brake shoes have rearward upper ends supported from the top of the horn, in the manner hereinafter described. Between the brake shoes and radially outwardly from the peripheries of the wheels, is a brake-applying device in the nature of a cam which is operable by a rearwardly extending cam rod, the arrangement being such that when the cam is turned by actuation of the cam rod, intermediate parts of the brake shoes are caused to be engaged with peripheral portions of the wheels to arrest the wheel movement.

In the drawings, the horn is indicated at 20, the intermediate partition or plate at 21, the axle at 22, the fixed top plate at 23, the wheels at 24, 24, the axle-surrounding skein at 25, the spiral springs appurtenant to the respective wheels at 26, the braking device generally at 27, the elongated brake shoes at 28, the brake-applying cam at 29, the rod for turning the cam at 30, the peripheral portion of a wheel engageable by the brake shoe at 31, and the swivel pin interconnecting the top plate 23 with the upper part of the horn at 32.

Figure 11:
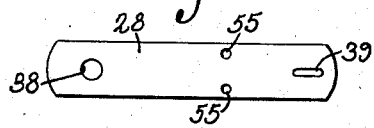
Fig. 11 is a face view on a smaller scale of one of the brake shoes.

Each spiral spring is connected at its inner end with the adjacent end of the corresponding skein by suitable means such as disclosed, for example, in Fig. 11 of the Herold Patent 2,377,232, and the outer or upper end of the spring is connected to the forked support or horn in any preferred manner, as by welding. At the lower end of each horn leg a snubbing clip or plate 33 is fixed in position for the purpose of snubbing the spring at that side of the caster.

The axle 22 is fixed in the lower ends of the horn legs so as to be stationary, and the extremities of the axle are provided with the customary or any preferred fastening members.

The partition 21 has a hole 34 near the lower end thereof through which the axle 22 passes. Each wheel has a suitable antifriction bearing structure, generally indicated at 35, placed between the hub portion 36 of the wheel and the external surface of the skein, as shown in Fig. 7. Adjacent the respective ends of each skein are protective disks or plates 37, one of which disks 37 is placed against the inner face of the corresponding horn leg while the other disk is somewhat spaced from the partition 21 so as to permit a brake shoe 28 to be placed between it and the partition.

Figure 4:
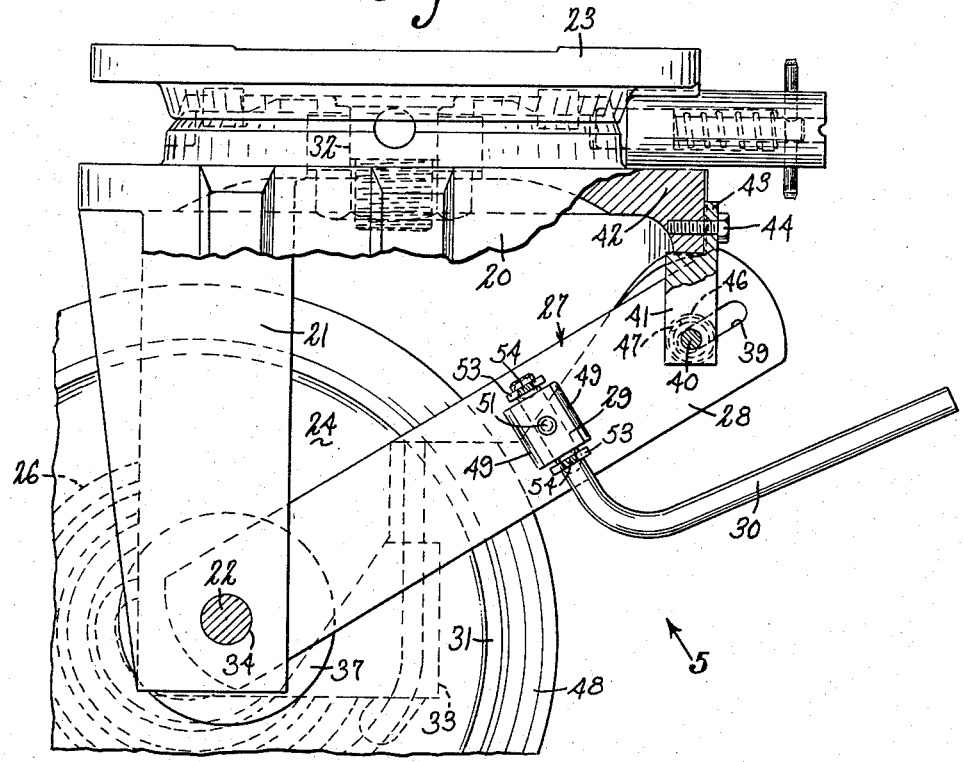
Fig. 4 is an enlarged section on line 4—4 of Fig. 2.
Figure 5:
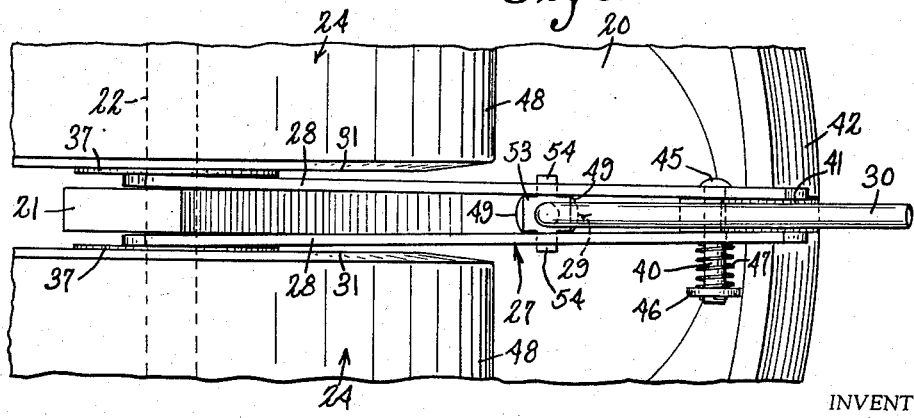
Fig. 5 is a fragmentary view looking in the direction of the arrow placed on Fig. 4, the brake shoes being in the released positions.

As indicated above, each brake shoe 28, which is in the form of an elongated plate, extends in a rearward and upward direction from the axle 22, and the forward lower end portion of the plate is provided with a hole 38 in which the axle is received with some clearance. Near the opposite end of the shoe plate the latter is provided with a relatively short longitudinal slot 39 through which passes a transverse supporting pin 40 for this end portion of the plate, said pin in turn being loosely supported in a transverse bore or hole provided in a block or member 41 that is attached to and depends from the top portion 42 of the horn at the rear of said portion. As shown in Fig. 4, the block 41 is cut away at the upper part to provide an upstanding flange 43 which receives a screw 44 that screws into a socket in the horn top plate. The body of the block 41 abuts the lower edge of the horn top plate, as shown in Fig. 4, and the arrangement is such that when the screw 44 is screwed into place the block 41 is firmly held in the position shown in Fig. 4, so that the cross pin 40 held by this block is held in a fixed position. The end portions of the cross pin are engaged in the slots 39 of the plates 28, and one end of the cross pin is provided with a head 45 overlying one of the brake plates while the other end is equipped with a surrounding stop washer 46 spaced outwardly from the other brake plate, a helical spring 47 being interposed between the washer and the plate, as shown in Figs. 5 and 6. The spring 47 is under compression, and normally it has the effect of pressing the brake plates toward each other, as shown in Fig. 5. However, when the cam 29 is moved to the position shown in Fig. 6, the brake plates are separated and take the position shown in Fig. 6, where these plates engage the peripheral portions 31 of the wheels to brake the wheels.

In the case shown, each wheel is provided with a thick tread 48 of rubber or other suitable resilient composition, the side face of the tread portion being sloped, as shown in Fig. 7, and the arrangement being such that, when the brake plates are separated by the cam, portions of said plates are engaged flatwise with the peripheral wheel rim portions 31, which are close to the tread portion and in this particular instance are of metal. The braking surfaces on the wheel in this case are relatively narrow, but the arrangement shown herein provides ample braking effect upon the wheel when the cam, hereinafter described, is moved to the braking position. When the cam is returned to the inoperative position shown in Fig. 5, the spring 47 acts again to move the plates or shoes to the inoperative position.

The holes 38 in the brake shoes are sufficiently large to permit the shoes to swing relatively to the axle in moving between the positions of Figs. 5 and 6, and at the opposite ends of the shoes the slots 39 engaging the cross pin 40 permit the necessary movement of the plates in which they swing toward and away from each other with the intermediate portion of the axle acting as a pivotal support.

The cam 29 may have the contour shown in Fig. 10, that is to say, it may have a rectangular body portion at the ends of which are symmetrically rounded camming surfaces 49. When the cam is in the inoperative position of Fig. 5, its elongated body is approximately parallel to the brake shoes, but when the cam is turned on an axis in a plane approximately parallel to the planes of the brake shoes, the rounded end portions of the cam engage the shoes in a manner to separate the shoes from each other. The cam rod or handle 30 in this form has a bend intermediate of its ends, as shown in Fig. 4, so that one portion is approximately at right angles to the other portion. One end portion of the rod passes through the cam body by engaging a hole 50 in said body, and the rod is fixed in place by means such as a transverse fastening pin 51, as shown in Fig. 8. By this arrangement the rod 30 provides extended bearing portions adjacent the flat opposite portions of the cam, as shown in Fig. 8. These bearing portions of the rod are engaged with holes 52 in supporting plates 53, one of which is shown in Fig. 9, and these plates 53 have end lugs 54 that are projected into round holes 55 provided in the brake shoes. When the lugs 54 of plates 53 are engaged with the holes 55, the cam is held from displacement in an axial direction and the cam is supported for turning movement between the mounting plates 53. In the inoperative position of the cam, the brake shoes have the relationship to these mounting plates shown in Fig. 5, and in the braking position the relationship is as shown in Fig. 6, the described arrangement providing for appreciable movement of the brake shoes lengthwise of the lug portions 54. However, it will be noted that separating movement of the brake shoes is limited by the cross pin structure 40, 45, 46, 47, and by this limitation the shoes are prevented at all times from disengaging the end lugs of the mounting plates 53. Or, to put the matter in another way, the arrangement is such as to maintain at all times the mounting of the cam between the brake shoes.

It is believed that the mode of operation of the brake mechanism will be apparent from the foregoing description. The manipulating rod or handle for the cam is preferably formed and arranged as shown in the drawings, the manipulating portion or arm being at the rear of the caster by preference, as illustrated, and being located slightly above the wheel axle and in the "off" position inclined upwardly and rearwardly to a slight extent, the end of the cam rod preferably extending in this position rearwardly to a degree beyond the top plate of the caster. With the cam rod so located, it may be turned to apply the brake shoes to the wheels by hand manipulation or by the use of the person's foot to give it the necessary swinging movement. The brake shoes are applied by bringing the cam rod handle to a transverse position, as shown in Fig. 7. In the location above mentioned the handle is readily accessible for hand or foot operation to release the shoes as well as to place them in braking position. In braking the caster wheels, the handle of the cam may be swung out of the longitudinal position in either direction. In Fig. 6, the handle in the braked position is at one side of the caster, but if desired it may be extended toward the other side. The manipulation for applying and releasing the brake shoes is very easy and convenient.

It will be noted that in the released position of the shoes, shown in Fig. 5, the shoes lie against or close to the longer sides of the cam in a position in which they are symmetrical to the longitudinal axis of the caster, this being due to the action of the spring 47 which normally holds them in this position. It is understood that the cross pin 40 is slidable with respect to the block 41, and that when the shoes are in the position of Fig. 5 the cross pin is considerably asymmetrically disposed with reference to the longitudinal axis of the caster inasmuch as the fixed head 45 on the cross pin is held against the outer face of one of the shoes, while a major portion of the pin is extended laterally beyond the other shoe, the helical spring 47 being in substantially expanded condition. When the cam is turned to spread apart the shoes, the rounded ends of the cam act uniformly on the shoes and thus the parts are moved to the position shown in Fig. 6, the result being that the spring 47 is compressed to a considerable degree; and in this position the cross pin is in an approximately symmetrical relationship to the axis above mentioned.

The mounting of the rear ends of the shoes from the top of the horn is such as to keep said rear ends in line with each other transversely of the caster while not interfering with the swinging movement of said ends toward and away from each other, and the described mounting of said rear ends also limits their separation from each other and thus maintains the mounting of the cam in the space between the shoes as the shoes are moved toward and away from each other. The mounting plates or bearing plates 53, between which he cam is placed, also have their body portions arranged to stand between the shoes in close proximity when the shoes are in the released position (Fig. 5).

It is apparent that the disclosed caster is one in which a forked support or horn supports a common axle for two wheels arranged side by side about the axle, said wheels being separated by a partition within the horn, and the caster as thus constructed being provided with brake shoes applicable to the sides of the respective wheels, said shoes being located in close proximity to the partition at opposite sides of the latter, and being applicable simultaneously to co-acting surfaces of the wheels. The shoes are supported at their forward ends from the axle and are upwardly and rearwardly inclined from the axle, having rear ends supported from the top of the horn and mounted for lateral swinging movement toward co-acting surfaces of the wheels. These shoes are separable by a cam device having a permanent mounting between the shoes at an intermediate point in the shoe length. The handle for operating the cam extends rearwardly when the shoes are in the released position, and for applying the brake, the rod or handle can be swung either to the right or to the left, as above described. A spring associated with the mounting for the rear ends of the shoes normally urges the shoes toward each other.

The partition or wall 21 provided within the horn is relatively narrow, thus leaving exposed substantial portions of opposite wheel faces to be acted upon by portions of the brake shoes extended rearwardly beyond the partition. The manner of mounting the brake shoes upon the axle at their forward ends enables the shoes to pivot or swing. These shoes are normally held in approximate parallelism by a spring acting upon the rear portions of the shoes, so as to be in the released position, but are subject to the action of a member which thrusts one shoe toward one wheel and simultaneously thrusts the other shoe toward the other wheel, this device being a turnable device which will operate in this way when swung in either of two directions. When the cam member is moved to a braking position such as shown in Fig. 6, the member is very securely held in place by the pressure of the brake shoes or plates and will not be readily dislocated. The elongated shoes are somewhat resilient, which enables the cam to be held in the braking position very securely by a wedging action, the pressure of the shoes being against the rounded ends of the cam.

The invention provides an improved form of duplex caster having an effective, conveniently operable braking device normally standing in the released position, but operable to apply effective braking to both wheels simultaneously. Further advantages will be obvious from the foregoing description.

Various changes and modifications may be made without departure from the principles of the invention or the scope of the claims.

What I claim is:

1. A duplex wheel structure comprising a horn having depending legs, an axle supported by the lower ends of said legs, a partition within the horn in fixed relation thereto and supporting an intermediate part of said axle, wheels rotatable about the axle at opposite sides of said partition, a braking device comprising elongate shoes adapted to engage the inner faces of the wheels and having forward ends supported slidably and pivotally on the axle at opposite sides of said partition, said shoes extending generally radially from the axle and having rear end portions supported by the top of the horn for generally axial movement toward and away from one another, and a cam device having an elongate cam body turnably mounted by and between the brake shoes for engagement therewith in a position spaced from the axle in the direction of the horn support of the shoes and serving to apply the brake shoes to the wheels by a separating movement of the shoes.

2. A duplex wheel structure comprising a horn having depending legs, an axle supported by the lower ends of said legs, wheels rotatable about said axle in axially spaced arrangement, a braking device for said wheels having elongate shoes supported adjacent one end on said axle and extending generally radially from the axle for support by said horn, said shoes being slidably and pivotally carried by the axle and movably carried by the horn for generally axial movement toward and away from one another, the portions of said shoes intermediate their supports being engageable with the side faces of the wheels, and structure extending between the shoes in a position spaced from the axle in the direction of the horn support for the shoes and operable to separate the shoes to brake the wheels.

3. A duplex wheel structure comprising a horn having depending legs, an axle supported by the lower ends of said legs, wheels rotatable about said axle in axially spaced arrangement, a braking device for said wheels having elongate shoes supported adjacent one end on said axle and extending generally radially from the axle for support by the horn, said shoes being slidable and pivoted on the axle and movable on the horn for generally axial movement toward and away from one another, the portions of said shoes intermediate their supports being engageable with the side faces of the wheels, said shoes being spring biased to wheel releasing position, and a rotary cam member mounted by and between the shoes for engagement therewith in a position spaced from the axle in the direction of the horn support for the shoes for applying the shoes to the wheel faces by a separating movement of the shoes.

4. In a caster, the combination of a horn having depending legs, an axle supported by the lower ends of the horn legs, a pair of wheels in axially spaced relationship rotatable about the axle and provided with opposing faces, said faces being provided with braking surfaces near the wheel peripheries, a pair of elongate spring-biased brake shoes for engaging said braking surfaces, each shoe having one end slidable and pivoted on the axle and extending generally radially from the axle, the other end of each shoe movably supported from the upper part of the horn top for generally axial swinging movement of parts of the shoes toward the braking surfaces on the wheels, and means mounted between said shoes and engaging the shoes in a position spaced from the axle in the direction of the horn support for the shoes to impart the swinging movement thereto so as to apply the brake shoes to the wheels.

5. In a duplex wheel structure having a horn, an axle supported by the horn, a pair of wheels rotatable about the axle, brake shoes having one of their ends pivoted and slidable on said axle and extending generally radially from the axle, a member for supporting the other ends of said shoes from the horn top carrying a cross pin slidably extending through said shoes and equipped with a spring biasing the shoes to a wheel releasing position, and a cam structure carried on and between the shoes at a position between the axle and the other shoe ends for moving the shoes generally axially away from each other to a wheel braking position.

6. A duplex wheel structure comprising a horn, a narrow upright partition within said horn at the forward end thereof, an axle supported by the lower end of the horn and by said partition, wheels rotatably mounted on the axle at opposite sides of the partition and having substantial portions of their faces radially outwardly of the vertical edges of said partition, a pair of shoes pivoted and slidable on said axle at opposite sides of said partition and having substantially radially extending portions movably supported from the top of the horn for generally axial movement of said last-mentioned portions toward and away from one another, said shoes being spring urged generally axially toward one another to occupy a released position and being movable generally axially in a separating direction to engage braking surfaces on the faces of said wheels, and a movable cam member interposed between said shoes in a position spaced from the axle in the direction of the horn support for the shoes and operable to cause braking movement of said shoes.

7. A duplex wheel structure comprising a horn, an axle supported by the lower end portion of the horn, wheels rotatably mounted on the axle in axially spaced arrangement, brake shoes in the form of elongated resilient plates slidably and pivotally supported by the axle, a portion of the shoes extending generally radially from the axle and engageable with opposing face portions of the wheels, structure supporting the shoes against rotation around the axle, a cam member interposed between said shoes along the radially extending portion and operable to move the shoes generally axially into engagement with the wheel face portions, and a spring normally biasing the shoes from engagement with the wheel face portions.

8. In a wheel structure, a support means including an axle, a pair of elements carried by the support means, at least one of the elements comprising a wheel rotatably mounted on the axle, the other element axially spaced from the wheel and restrained against axial movement, a pair of elongate members slidably and pivotally carried by the axle between the elements, the member adjacent the wheel being a brake shoe, portions of the members extending generally radially from the axle, the radially extending portions carried by the support means for generally axial movement toward and away from each other, and a cam structure interposed between the radially extending portions and operable to engage and move the shoes generally axially into engagement with the other element and into braking engagement with the wheel.

9. A duplex wheel structure comprising means providing an axle and an axle support, a pair of wheels on the axle, a pair of elongate brake shoes each extending generally radially from the axle and each having an end slidably and pivotally receiving the axle intermediate said wheels, the portions of the shoes intermediate their ends being engageable with the respective wheels, means on the axle support for supporting the other ends of said shoes and comprising a cross pin extending through said shoes, the last-named means limiting separating movement of the last-mentioned ends of the shoes and including a spring urging the last-mentioned ends toward one another, a pair of spaced supporting plates between the shoes intermediate the axle and their other ends and provided with rigid transversely directed lugs extending into and slidable relative to said shoes, and a rotary cam member journaled in said plates and provided with a manually operable element to move said shoes generally axially into engagement with the respective wheels.

References Cited in the file of this patent

UNITED STATES PATENTS

| Number | Name | Date |
| --- | --- | --- |
| 92,104 | Scripture et al. | June 29, 1869 |
| 272,348 | Stone | Feb. 13, 1883 |
| 301,434 | Cyr | July 1, 1884 |
| 1,480,851 | Baum | Jan. 15, 1924 |
| 1,900,282 | Halbach | Mar. 7, 1933 |
| 1,913,822 | Walker | June 13, 1933 |
| 2,213,383 | Canfield | Sept. 3, 1940 |
| 2,236,655 | Viau | Apr. 1, 1941 |